United States Patent [19]

Hurley et al.

[11] Patent Number: 5,197,640
[45] Date of Patent: Mar. 30, 1993

[54] BICYCLE BASKET APPARATUS

[76] Inventors: James J. Hurley; Michael F. Wood, both of 208 Oak St., Corinth, N.Y. 12822

[21] Appl. No.: 824,375

[22] Filed: Jan. 23, 1992

[51] Int. Cl.$^5$ .............................................. B62J 7/00
[52] U.S. Cl. .................................... 224/30 A; 224/36; 224/41; 224/919; 248/231.4; 211/14; 269/95
[58] Field of Search .................... 224/30 A, 35, 36, 41, 224/919, 32 R, 148, 30 R, 33 R, 33 A, 37, 38, 39, 40, 42; 248/231.4 R, 231.7, 230, 541, 540, 309.1, 316.4; 211/107, 14 R; 269/45, 46, 95 R, 97; 108/28, 29, 30, 42, 44; 126/98, 30

[56] References Cited

U.S. PATENT DOCUMENTS

| | | | |
|---|---|---|---|
| 441,679 | 12/1890 | Lynan | 224/38 |
| 556,951 | 3/1896 | Williams et al. | 224/41 X |
| 594,683 | 11/1897 | Duck | 224/40 |
| 965,436 | 7/1910 | Brott | 224/40 |
| 3,393,888 | 7/1968 | Henningjgard | 248/230 |
| 4,315,583 | 2/1982 | Hine | 224/41 |
| 4,415,105 | 11/1983 | Jackson | 224/39 X |
| 4,798,318 | 1/1989 | Irwin | 224/36 X |
| 5,024,359 | 6/1991 | Thomas | 224/36 |
| 5,042,769 | 8/1991 | Sned | 248/230 X |

Primary Examiner—Henry J. Recla
Assistant Examiner—Glen T. Barrett
Attorney, Agent, or Firm—Leon Gilden

[57] ABSTRACT

A bicycle basket is arranged for convenience of transport of various components, such as a football and the like therewithn, utilizing a framework formed with a plurality of rigid legs, each rigid leg including a "C" shaped hook mounted to each distal end of each rigid leg projecting downwardly for securement about handlebars of an associated bicycle, with an intermediate lock leg utilizing a hook to provide for locking engagement with the handlebars in association with the "C" shaped hooks. The basket structure includes a plurality of concave frame legs projecting rearwardly of the rigid legs, with an elastomeric mesh web in surrounding relationship relative to the frame legs, with the mesh web including a plurality of straps mounted to a forward distal end of the mesh web in an opening thereof, with each strap including a hook and loop fastener structure for securement about an associated portion of the framework. A modification of the invention includes a counterbalance reservoir arranged for use to contain fluid refreshment, as well as effecting counterbalancing of the mesh basket and component stored therewithin.

5 Claims, 4 Drawing Sheets

FIG. 1
FIG. 2
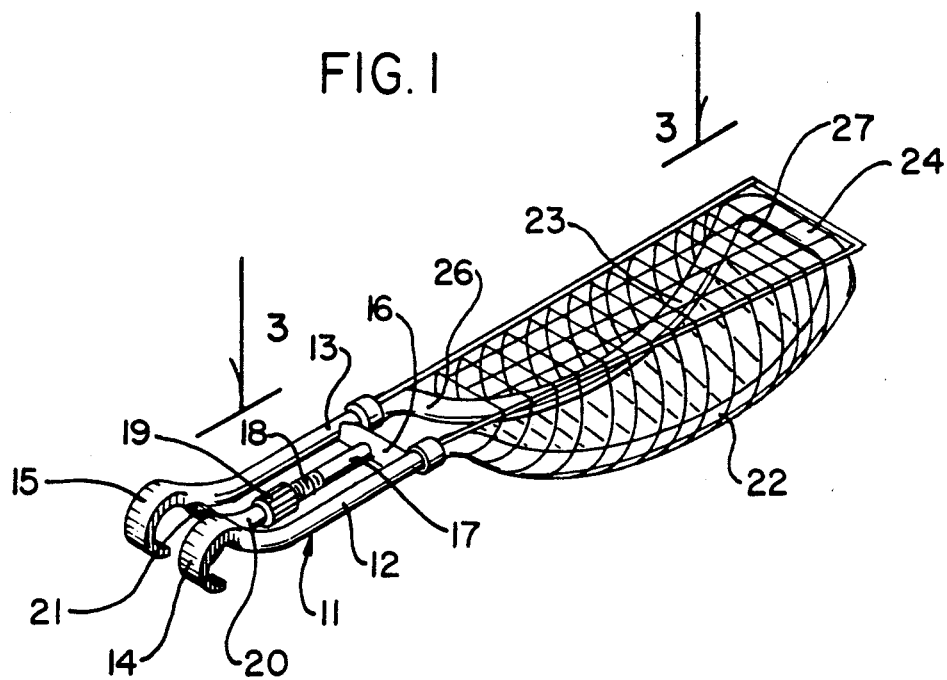
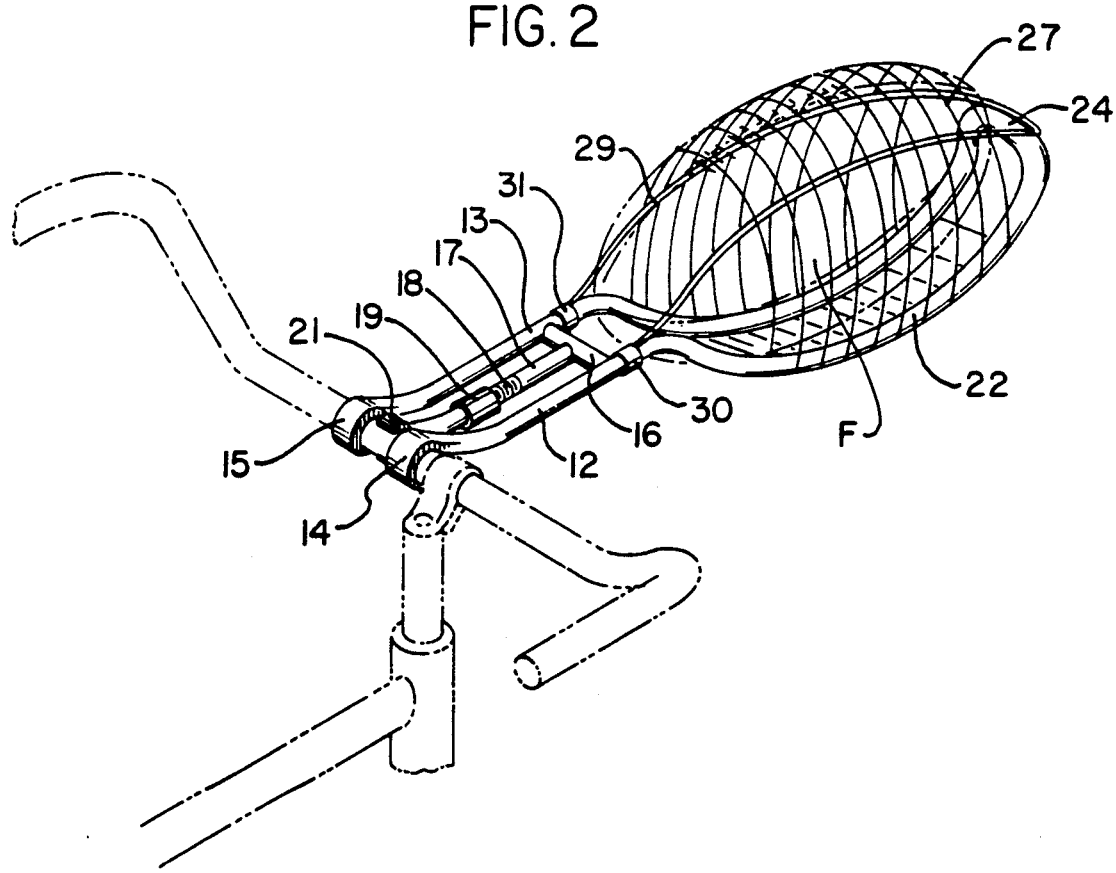

BICYCLE BASKET APPARATUS

BACKGROUND OF THE INVENTION

1. Field of the Invention

The field of invention relates to bicycle transport apparatus, and more particularly pertains to a new and improved bicycle basket apparatus wherein the same is arranged to provide for a bicycle structure to permit ease of transport of various components relative to the associated bicycle.

2. Description of the Prior Art

Various bicycle basket-type structures are utilized for the transport of various items relative to an associated bicycle. Such apparatus is exemplified in U.S. Pat. No. 4,282,993 to Humlong setting forth a bicycle basket and carrier wherein the basket is arranged for ease of mounting and dismounting relative to the carrier structure.

U.S. Pat. No. 3,695,496 to Humlong sets forth a further example of a bicycle basket mounted medially and forwardly of associated bicycle handlebars.

U.S. Pat. No. 4,730,758 to McMurtey sets forth a further example of a detachable bicycle basket.

U.S. Pat. No. 3,995,803 to Ultz sets forth a foldable bicycle basket arranged for mounting relative to an associated bicycle.

As such, it may be appreciated that there continues to be a need for a new and improved bicycle basket apparatus as set forth by the instant invention which addresses both the problems of ease of use as well as effectiveness in construction in permitting ease of transport of various sporting components such as a football therewithin and in this respect, the present invention substantially fulfills this need.

SUMMARY OF THE INVENTION

In view of the foregoing disadvantages inherent in the known types of bicycle basket apparatus now present in the prior art, the present invention provides a bicycle basket apparatus wherein the same is arranged for the transport and storage of various sporting ball members. As such, the general purpose of the present invention, which will be described subsequently in greater detail, is to provide a new and improved bicycle basket apparatus which has all the advantages of the prior art bicycle basket apparatus and none of the disadvantages.

To attain this, the present invention provides a bicycle basket arranged for convenience of transport of various components, such as a football and the like therewithin, utilizing a framework formed with a plurality of rigid legs, each rigid leg including a "C" shaped hook mounted to each distal end of each rigid leg projecting downwardly for securement about handlebars of an associated bicycle, with an intermediate lock leg utilizing a hook to provide for locking engagement with the handlebars in association with the "C" shaped hooks. The basket structure includes a plurality of concave frame legs projecting rearwardly of the rigid legs, with an elastomeric mesh web in surrounding relationship relative to the frame legs, with the mesh web including a plurality of straps mounted to a forward distal end of the mesh web in an opening thereof, with each strap including a hook and loop fastener structure for securement about an associated portion of the framework. A modification of the invention includes a counter-balance reservoir arranged for use to contain fluid refreshment, as well as effecting counterbalancing of the mesh basket and a component stored therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S Patent and Trademark Office and the public generally, and especially the scientists, engineers and practitioners in the art who are not familiar with patent or legal terms or phraseology, to determine quickly from a cursory inspection the nature and essence of &he technical disclosure of the application. The abstract is neither intended to define the invention of the application, which is measured by the claims, nor is it intended to be limiting as to the scope of the invention in any way.

It is therefore an object of the present invention to provide a new and improved bicycle basket apparatus which has all the advantages of the prior art bicycle basket apparatus and none of the disadvantages.

It is another object of the present invention to provide a new and improved bicycle basket apparatus which may be easily and efficiently manufactured and marketed.

It is a further object of the present invention to provide a new and improved bicycle basket apparatus which is of a durable and reliable construction.

An even further object of the present invention is to provide a new and improved bicycle basket apparatus which is susceptible of a low cost of manufacture with regard to both materials and labor, and which accordingly is then susceptible of low prices of sale to the consuming public, thereby making such bicycle basket apparatus economically available to the buying public.

Still yet another object of the present invention is to provide a new and improved bicycle basket apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of the invention mounted to an associated handlebar structure of a bicycle

DESCRIPTION OF THE PREFERRED EMBODIMENT

Figure 3:
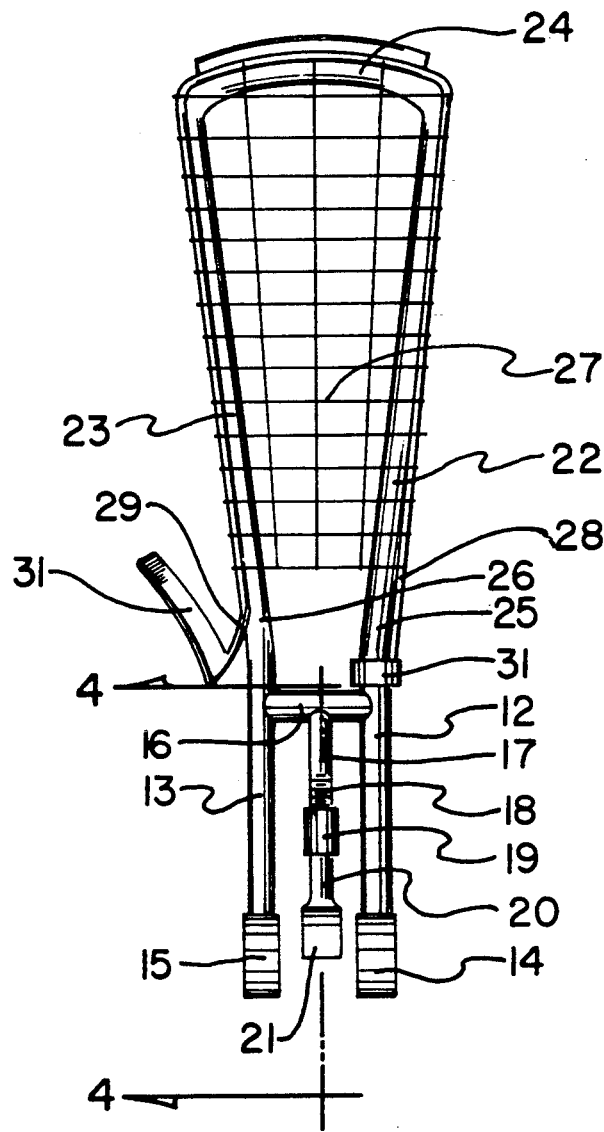
FIG. 3 is an orthographic view, taken along the lines 3—3 of FIG. 1 in the direction indicated by the arrows.
Figure 4:
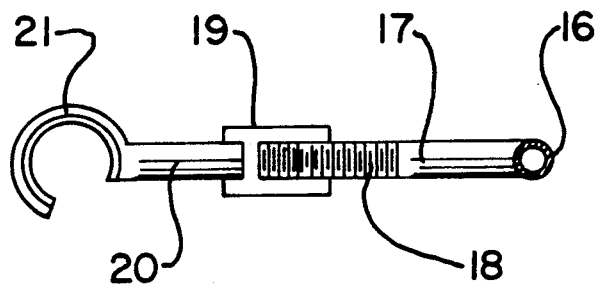
FIG. 4 is an orthographic view, taken along the lines 4—4 of FIG. 3 in the direction indicated by the arrows.

With reference now to the drawings, and in particular to FIGS. 1 to 7 thereof, a new and improved bicycle basket apparatus embodying the principles and concepts of the present invention and generally designated by the reference numerals 10 and 10a will be described.

More specifically, the bicycle basket apparatus 10 of the instant invention essentially comprises a support frame 11, including a first rigid leg 12 spaced from, parallel to, and coextensive with a second rigid leg 13. The first and second rigid legs 12 and 13 respectively include first and second "C" shaped hooks 14 and 15 whose openings are oriented downwardly relative to each rigid leg, with a first cross brace 16 extending orthogonally and integrally relative to the first and second rigid legs adjacent rear distal ends thereof. A first lock leg 17 is orthogonally and medially mounted relative to the first cross brace 16 extending between the first and second rigid legs 12 and 13 terminating in a first lock leg externally threaded portion 18 cooperative with a first lock sleeve 19 that is rotatably mounted to a second lock leg 20 coaxially aligned with the first lock leg (see FIG. 4). A second lock leg "C" shaped pressure hook 21 whose opening is oriented upwardly and medially between the first and second "C" shaped hooks 14 and 15 is arranged in cooperation with the first and second "C" shaped hooks 14 and 15 to grasp an associated handlebar structure of a bicycle, such as illustrated in FIG. 2.

A first concave support leg and a second concave support leg 22 and 23 respectively that are parallel and coextensive relative to one another and joined to the respective first and second rigid legs 12 and 13 at respective first and second intersections 25 and 26 and extend rearwardly of the first and second lock legs and therebelow terminating in a second cross brace 24 extending between rear distal ends of the first and second support legs 22 and 23 to form a generally "U" shaped configuration. The second brace 24 is arranged parallel to the first brace 16. Upon extension of the second lock leg by rotation of the first lock sleeve 19, tensioning of the second lock leg "C" shaped pressure hook 21 relative to the first and second "C" shaped hooks 14 and 15 is effected in clamping of the framework 11 relative to the handlebar structure.

An elastomeric mesh sheath 27 is fixedly secured coextensively to the first and second support legs 22 and 23 and the second cross brace 24 extending between the support legs and extending thereover to define a bag-like structure whose opening is in confrontation with the first cross brace 16 and wherein the sheath includes respective first and second sheath straps 28 and 29 extending from the opening, including respective first and second hook and loop strap members 30 and 31 to secure the first and second straps 28 and 29 to the first and second respective intersections 25 and 26. In this manner, a sporting ball such as a football "F" is arranged for projection into the elastomeric mesh sheath 27 defining the bag-like structure for ease of transport thereof.

Figure 5:
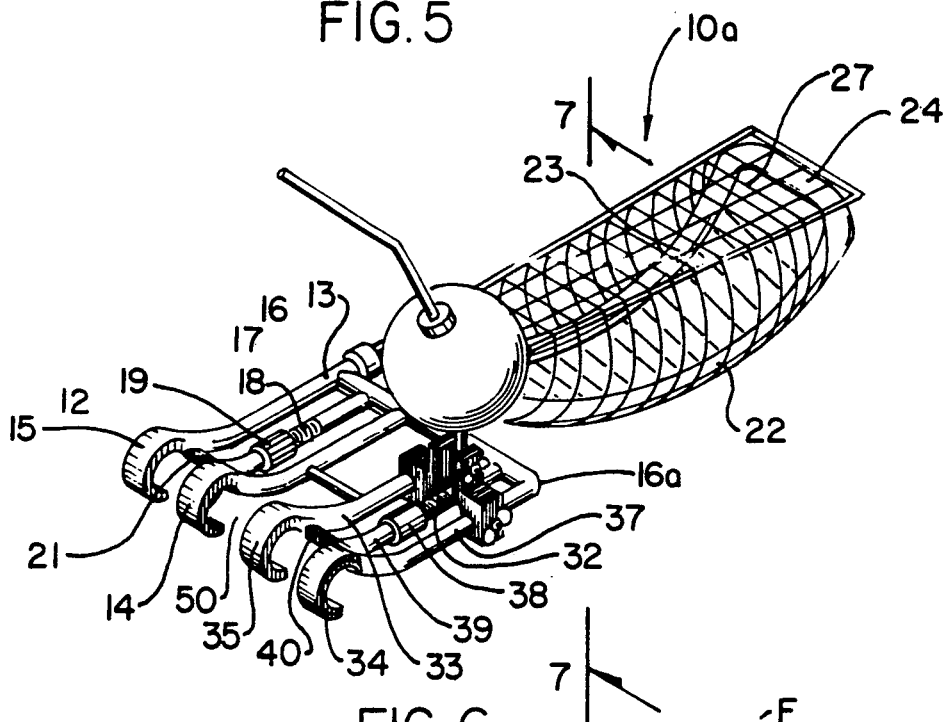
FIG. 5 is an isometric illustrated of a modification of the invention.
Figure 6:
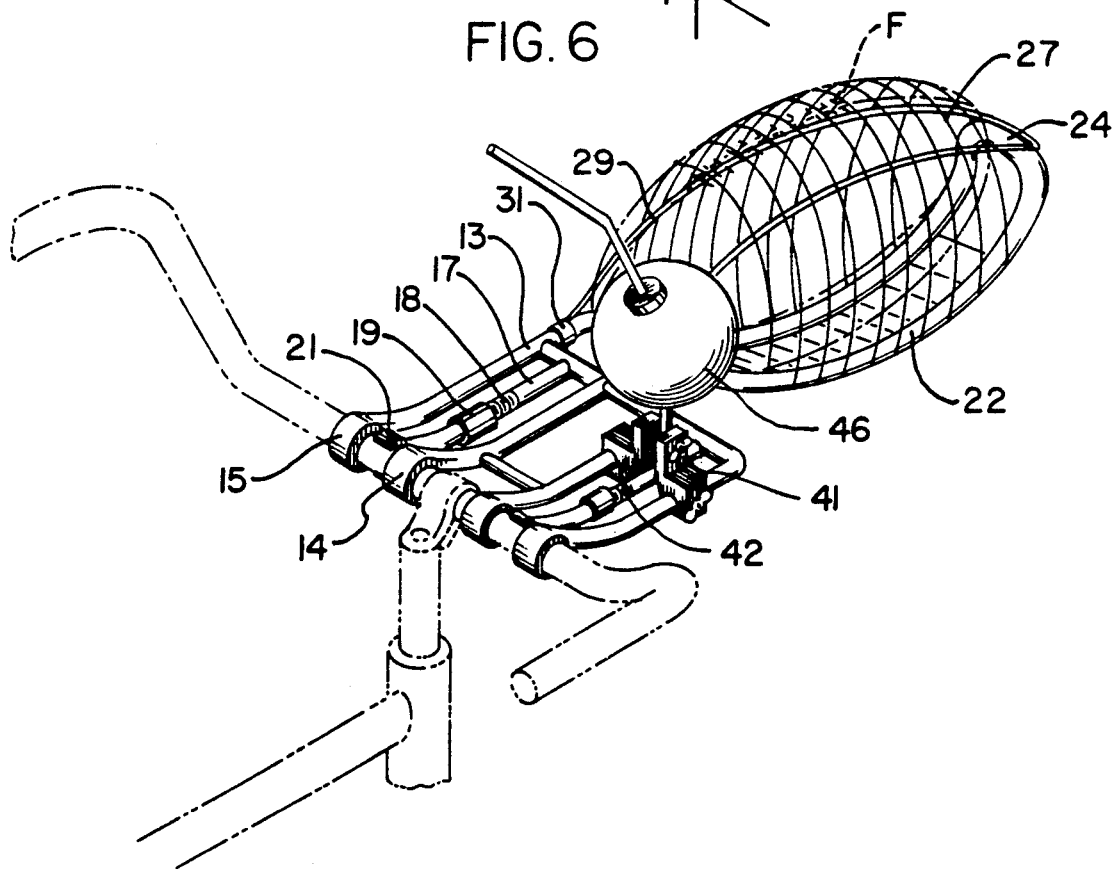
FIG. 6 is an isometric illustration of the invention mounted to a handlebar structure of a bicycle.
Figure 7:
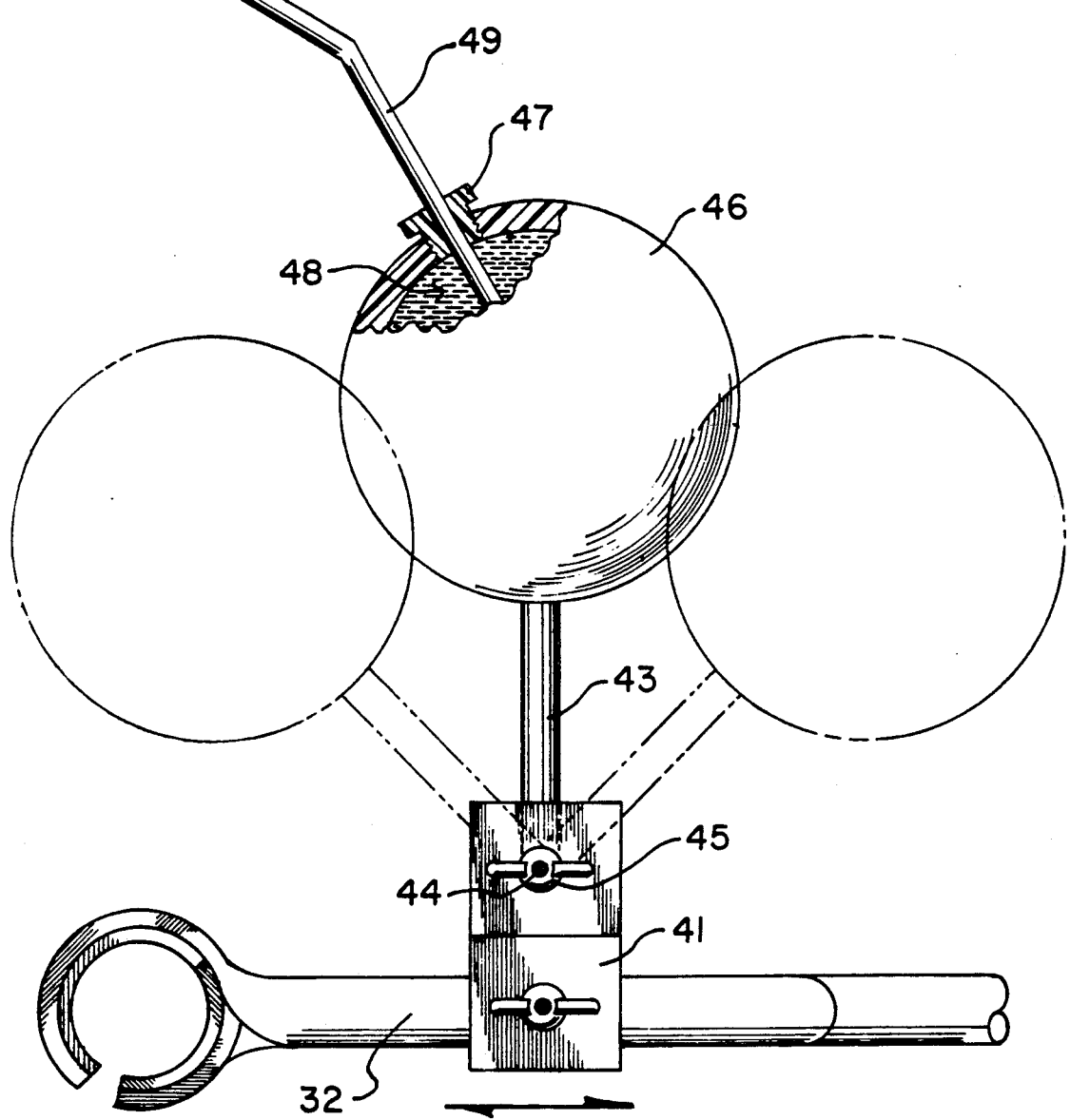
FIG. 7 is an orthographic view, taken along the lines 7—7 of FIG. 5 in the direction indicated by the arrows.

The FIGS. 5-7 illustrate a modified aspect of the invention 10a, to include a third and fourth rigid leg 32 and 33 that are parallel and coextensive relative to one another and positioned adjacent and laterally of the first rigid leg 12 and orthogonally mounted to a first cross brace extension 16a extending longitudinally of the first cross brace 16 and laterally of the first rigid leg 12. A third cross brace 50 extending forwardly of and parallel to the first cross brace 16 extends orthogonally and integrally between the first rigid leg 12 and a fourth rigid leg 33 parallel to the third rigid leg 32 The third and fourth rigid legs 32 and 33 terminate in respective third and fourth "C" shaped hooks 34 and 35 whose openings project downwardly and cooperate with a fourth lock leg "C" shaped pressure hook 40 whose openings is oriented upwardly relative to the third and fourth hooks 34 and 35. The fourth lock leg "C" shaped pressure hook 40 is mounted at a forward distal end of a fourth lock leg 39 that includes a second lock sleeve 38 threadedly securable to a free distal end of a third lock leg 36 integrally and orthogonally mounted to the extension 16a positioned medially between the third and fourth rigid legs 32 and 33 and terminating in a third lock leg externally threaded second end 37 in a manner as related to the first lock sleeve 19, illustrated in FIG. 4. A first and second clamp boss 41 and 42 are mounted to third and fourth rigid legs 32 and 33 extending upwardly thereof, with a support rod 43 having its lower distal end pivotally mounted about a pivot axle 44 directed orthogonally between the first and second clamp bosses 41 and 42, with a pivot axle clamp 45 effecting threaded securement of the support rod 43 between the clamp bosses 41 and 42. The upper distal end of the support rod 43 terminates in a fluid reservoir 46, including a fill plug 47 removably mounted to the reservoir 46 containing a drinking fluid 48 therewithin, with a drinking conduit 49 projecting through the fill plug 47 into the reservoir 46. In this manner when a football member "F" is contained within the sheath 27, counter-balancing thereof is available by projecting a quantity of fluid into the reservoir 46 and simultaneously permitting use of the reservoir as a source of fluid refreshment.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted tog falling within the scope of the invention.

What is claimed as being new and desired to be protected by Letters Patent of the United States is as follows:

1. A bicycle basket apparatus arranged for securement to an associated bicycle handlebar, wherein the apparatus comprises, a support frame, the support frame including a first rigid leg having a distal end, the first leg being spaced from, parallel to, and coextensive with a second rigid leg having a distal end, the first rigid leg and the second rigid leg each include a respective first and second "C" shaped hook integrally mounted at a first distal end of the first and second rigid legs respectively, and the first "C" shaped hook defines a first "C" shaped hook opening oriented in a first direction and the second "C" shaped hook defines a second "C" shaped hook opening oriented in a first direction and a first cross brace connected to and extending orthogonally between the first rigid leg and the second rigid leg, wherein a first lock leg is mounted to the first cross brace and extends orthogonally therefrom to a first free end such that the first lock leg extends parallel to and is positioned between the first rigid leg and the second rigid leg, the first lock leg includes a first lock sleeve adjustably mounted to the first end and a second lock leg rotatably mounted at one end to the first lock sleeve and the second lock leg includes a second lock leg "C" shaped pressure hook mounted to another end of the second lock leg and being spaced from the first lock sleeve, wherein the second lock leg "C" shaped pressure hook defines a second lock leg "C" shaped pressure hook opening oriented in a second direction wherein the second direction is opposite to the first direction whereby the first and second "C" shaped hooks and the "C" shaped pressure hook are adapted to be releasably secured to the handle bar and a first support leg extending rearwardly and longitudinally of the first rigid leg, and a second support leg extending rearwardly and longitudinally of the second rigid leg, and, a second cross brace connected to and extending orthogonally between the first support leg and the second support leg for supporting a transport item therebetween.

2. An apparatus as set forth in claim 1 wherein the first and second support legs are of a concave configuration, and the first support leg and the second support leg are arranged in a parallel coextensive relationship, and the apparatus further includes an elastomeric mesh sheath surrounding the first support leg, the second support leg and the second cross brace thereby forming an enclosure for securing objects therein, and the elastomeric mesh sheath defines a sheath opening adjacent to the first cross brace, and the opening includes a first sheath strap and a second sheath strap, wherein the first sheath strap includes a first strap member securable to the first rigid leg, and the second sheath strap includes a second strap member securable to the second rigid leg.

3. An apparatus as set forth in claim 2 wherein, the first cross brace includes a first cross brace extension extending therefrom, and wherein the first cross brace extension includes a third rigid leg and a fourth rigid leg orthogonally and integrally mounted to the first cross brace extension, wherein the third rigid leg and the fourth rigid leg are arranged parallel and coextensive relative to one another and parallel and coextensive to the first rigid leg and the second rigid leg, and the third rigid leg includes a third "C" shaped hook member and the fourth rigid leg includes a fourth "C" shaped hook member, and the third "C" shaped hook member and the fourth "C" shaped hook member include respective third and fourth hook openings oriented in the first opening.

4. An apparatus as set forth in claim 3 including a third lock leg mounted to the first cross brace extension extending orthogonally therefrom to a third free end such that the third lock leg extends parallel to and is positioned between the third rigid leg and the fourth rigid leg, and a second lock sleeve adjustably mounted to the third free end of the third lock leg, and a fourth lock leg rotatably mounted at one end to the second lock sleeve, the fourth lock leg including a fourth lock leg "C" shaped pressure hook defining a fourth lock leg "C" shaped pressure hook opening oriented in the second direction whereby the third and fourth "C" shaped hook members and the fourth "C" shaped pressure hook are adapted to be releasably secured to the handle bar.

5. An apparatus as set forth in claim 4 including a first clamp boss mounted to the third rigid leg, and a second clamp boss mounted to the fourth rigid leg, wherein the first clamp boss and the second clamp boss extend away from the third rigid leg and the fourth rigid leg, and a support rod pivotally mounted between the first clamp boss and the second clamp boss, wherein the support rod is mounted at a lower end to the first and second clamp bosses by a pivot axle pivotally connected to the first clamp boss and the second clamp boss, and a pivot leg clamp fastener mounted to the pivot axis to secure the pivot axle relative to and between the first clamp boss and the second clamp boss, and an upper distal end of the support rod includes a rigid reservoir, the reservoir including a fill plug, the fill plug including a drinking conduit directed through the fill plug extending into the reservoir.

* * * * *